United States Patent [19]
Endrigo

[11] Patent Number: 5,549,085
[45] Date of Patent: Aug. 27, 1996

[54] DEFLECTOR INSERT FOR AIR FILTERS

[76] Inventor: David A. Endrigo, 13310 Lakeshore Dr., Paulsbo, Wash. 98370

[21] Appl. No.: 323,369

[22] Filed: Oct. 14, 1994

[51] Int. Cl.$^6$ .................................................. B01D 47/00
[52] U.S. Cl. ................. 123/184.21; 55/462; 55/DIG. 28
[58] Field of Search ........................... 123/184.21, 198 E; 55/462, 464, 385.3, 434, 436, 498, 510, DIG 28; 138/89, 37, 44

[56] References Cited

U.S. PATENT DOCUMENTS

| | | | |
|---|---|---|---|
| 2,939,775 | 6/1960 | Middleton et al. | 48/180 |
| 2,983,592 | 5/1961 | Jones | 48/184 |
| 3,212,242 | 10/1965 | Florine | 55/510 |
| 3,224,174 | 12/1965 | Erbstoesser | 55/418 |
| 3,347,028 | 10/1967 | Erbstoesser | 55/510 |
| 3,670,480 | 6/1972 | Petersen | 55/430 |
| 3,807,144 | 4/1974 | Graybill | 55/462 |
| 5,062,875 | 11/1991 | Nagashima | 55/503 |

*Primary Examiner*—Marguerite McMahon
*Attorney, Agent, or Firm*—R. Reams Goodloe, Jr.

[57] ABSTRACT

An insert device for smoothing air flow from air filters to carburetors. The device is suitable for turning an air stream from an intake air passageway, which is directed inwardly along a plane from a periphery towards a center to a fuel/air mixing chamber having an annular downwardly flowing mixing passageway with a longitudinal axis at the center. The insert device includes a first end adapted to be operably located concentrically with the annular fuel/air passageway, and a second end opposite the first end. The first and second ends have a central axis extending therebetween. The second end has a center and an upper wall extending outwardly therefrom. A peripheral wall of diminishing outside diameter begins at a point spaced outwardly near the center of the second end and extends smoothly to a point of minimum diameter. From the point of minimum diameter, concave shaped subwalls of slightly increasing size extend downward to the first end. In an alternate embodiment, from the point of minimum diameter, a single peripheral wall of increasing diameter extends to and connects with the first end.

21 Claims, 2 Drawing Sheets

5,549,085

DEFLECTOR INSERT FOR AIR FILTERS

FIELD OF THE INVENTION

My invention relates to an apparatus for directing air flow from air filters into fuel/air mixing chambers of engines, and more particularly to a novel, improved air flow deflector applicable to use within air filters located at the air intake of internal combustion engines.

BACKGROUND

Internal combustion engines, and in particular those which use carburetors, have for many years used air filters to remove unwanted particulates from the combustion air stream before it enters the engine. Standard, stock air filters have been supplied in a multitude of dimensions by auto manufacturers, with each filter being adapted to fit over the chosen carburetor. Stock air filters have normally been provided without any particular emphasis on a design configuration that would tend to minimize pressure drop of the air stream as it flows through the device, or that would tend to provide a uniform flow downward air flow into the carburetor. Such prior art air filters have generally been of the type in which air is drawn radially inwardly through a vertical wall of a normally cylindrical air filter. In such devices, the air stream churns turbulently about in proximity of the center of the filter before being drawn downwards into the carburetor beneath the filter.

I am aware of various attempts, primarily in racing and other high performance applications, in which an effort has been made to improve the efficiency of the air flow design in air filters. Such attempts are largely characterized by design enhancements which make some sort of an attempt to smoothly guide the incoming air downwards into the carburetor. One such design is shown in U.S. Pat. No. 3,224,174 issued Dec. 21, 1965 to Erbstoesser for AIR-FEED DEVICE FOR CARBURETORS. In one embodiment, his invention provides a downwardly-pointed cone of solid metal or other suitable material to gather air and direct it toward a central opening therebelow. However, his device does not provide for a high efficiency air filtration device to be used in conjunction therewith. A somewhat similar design is disclosed in U.S. Pat. No. 3,347,028 issued Oct. 17, 1967 to Erbstoesser for AIR-FEED DEVICES FOR CARBURETORS. That design shows a combination air filter lid and flow smoothing cone shaped central interior wall. The design is not suitable to the retrofit of existing high performance air filters. Another design is illustrated in U.S. Pat. No. 3,670,480, issued Jun. 20, 1972 to Peterson for CLEANER. That device shows a cone-shaped center portion with a generally concave face and downwardly projecting drag ridges or ribs which cooperate with an annular rotating disc to separate particulates from the entering air stream. Like Erbstroesser, the Peterson design also lacks provisions for incorporation of a high efficiency filter.

For the most part, the documents identified in the preceding paragraph disclose devices which have one or more of the following shortcomings: (a) they do not include any means for retrofitting existing high efficiency air filters, and (b) some designs do not include provisions for high efficiency air filtration. Thus, the advantages of my simple insert design which may be retrofitted to existing high efficiency air filters are important and self-evident.

OBJECTS, ADVANTAGES, AND NOVEL FEATURES

I have now invented, and disclose herein, a novel, insert design for enhancing efficiency of flow in air filters which does not have the above-discussed drawbacks common to those somewhat similar products heretofore used of which I am aware. Unlike the earlier designs attempting to improve efficiency which have heretofore been available, my product is adaptable to retrofit use, and is simple, lightweight, relatively inexpensive and easy to manufacture, and otherwise superior to those designs heretofore used or proposed. In addition, it provides a significant, additional measure of power in high performance engines.

From the foregoing, it will be apparent to the reader that one important and primary object of the present invention resides in the provision of a novel insert device for improving the efficiency of air/fuel mixing by improving and smoothing the flow path and reducing the pressure drop through air filters on internal combustion engines.

Other important but more specific objects of the invention reside in the provision of an insert for air filters as described herein which:

can be manufactured in a simple, straightforward manner of non-corrosive materials;

in conjunction with the preceding object, have the advantage that they can be adapted by installation personnel to quickly establish an interfitting pattern within existing air filters which avoids any leakage of air around the filter element; and which in a relatively inexpensive manner can improve performance, efficiency and horsepower in automotive engines.

Other important objects, features, and additional advantages of our invention will become apparent to the reader from the foregoing and the appended claims and as the ensuing detailed description and discussion proceeds in conjunction with the accompanying drawing.

SUMMARY OF THE INVENTION

The present invention relates to a novel deflector insert for mounting and use in an automotive air filter. My deflector insert device is designed for use in an air filtration device for an internal combustion engine. The device is useful for turning an intake air stream from an intake air passageway, where the passageway has a center with an air stream directed inwardly along a plane from a periphery towards its center, to a fuel/air mixing chamber having an annular downwardly flowing mixing passageway with a longitudinal axis, where the longitudinal axis is located approximately at the center of the intake air passageway. The insert deflector device comprises a first end adapted to be operably located concentrically with the annular fuel/air passageway, and a second end opposite the first end. The first and second ends have a second central axis extending therebetween. The second end has a center and an upper wall extending outwardly therefrom. A peripheral wall of diminishing outside diameter beginning circumferentially at a point spaced outwardly from at or near the center of the second end, and extending smoothly to a point of minimum diameter is provided. From the point of minimum diameter downward to the first end, alternate embodiments include (a) a gradually increasing diameter peripheral wall, and (b) use of concave subwalls of gradually increasing width to form ridges to direct airflow downward into fuel/air mixing subpassageways, such as in a four barrel carburetor. Generally, the intake air passageway and the fuel/air mixing passageway are arranged so as to provide an annular fuel/air passageway adjacent, to the first end of the insert, so that air flows inward toward the peripheral wall of the insert and then is turned in a smooth transition along the peripheral wall to a downwardly direction adjacent the first end of the insert, and thence inward toward the annular fuel/air mixing passageway or its subpassageways.

The novel deflector insert device of the present invention provides higher efficiency and lower pressure drop across the air filter than does conventional air filters known to me. This performance factor and lower pressure drop is significant in various types of high performance automotive machinery design. The lower pressure drop requirements and more uniform fluid flow made possible by use of my novel insert design allows higher combustion efficiencies by allowing more uniform fuel-air mixtures to be provided by the carburetor system. Moreover, this combination makes feasible more powerful performance of an existing engine. In particular, the improvements provided by my insert device are manifested in better engine response and better airflow, which results in increased horsepower.

DESCRIPTION

Figure 1:
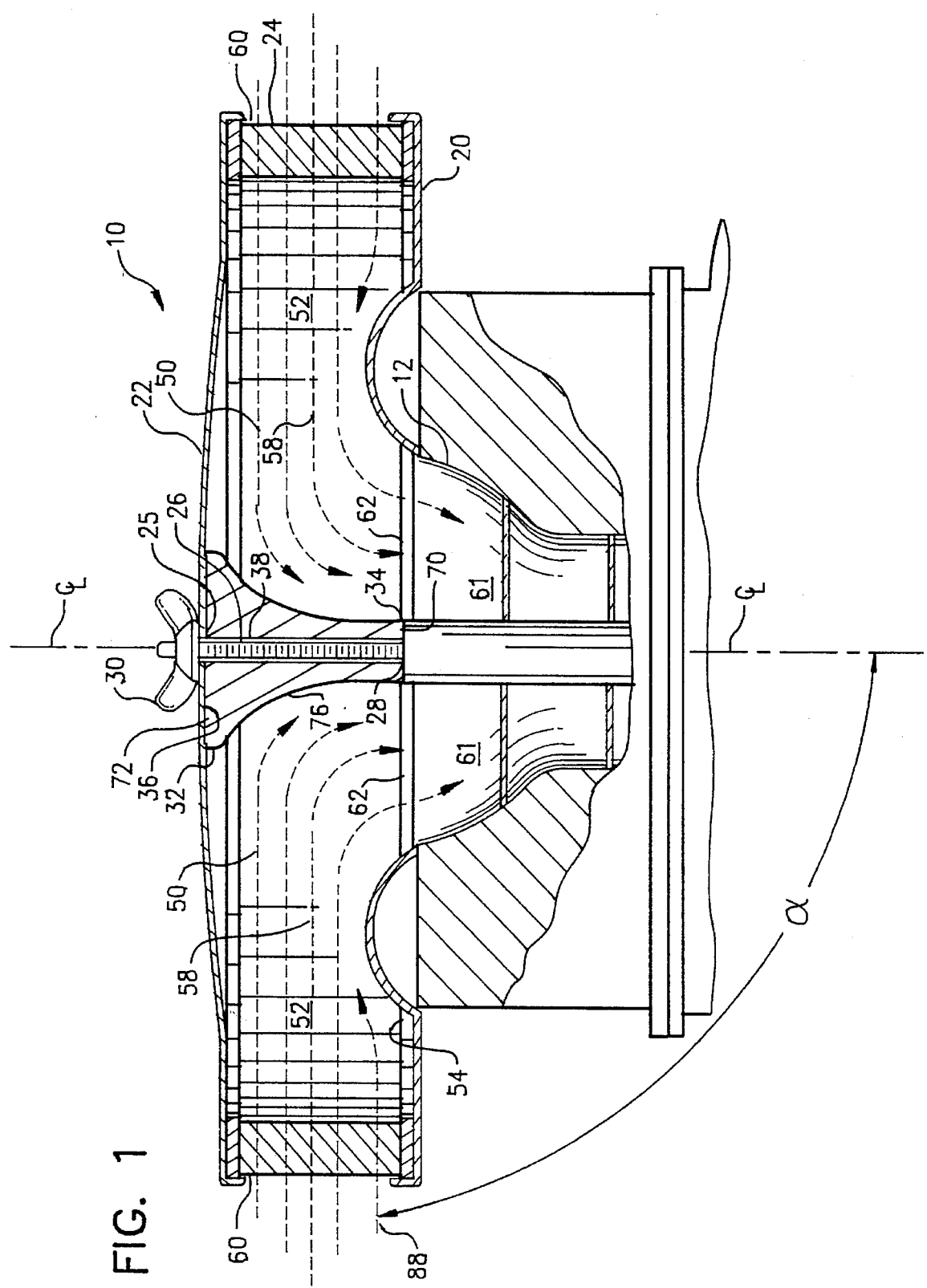
FIG. 1 is a partially broken-away vertical cross-sectional view of an insert device according to the present invention, mounted within an air filter on an internal combustion engine.

Attention is directed to FIG. 1 of the drawing wherein an air filter 10 is shown affixed above a racing type carburator 12 as would be typical for setting above a racing engine. The carburetor is typical of a Holley type 4150 or 4160. The filter 10 has a base 20 and a sheet metal lid 22 with a generally cylindrical intake air filter 24 sealingly fitted therebetween. The lid 22 has a center aperture 25 adapted to receive upwardly therethrough a threaded mounting stud 26 which is affixed to the center 28 of carburetor 12. The mounting stud 26 extends through the lid 22, so that the lid may be secured to the stud 26 via means of securing wingnut 30.

An insert device 32 according to the present invention is positioned between the upper reaches 34 of carburetor 12 and the lower surface 36 of lid 22. As shown, the insert 32 has a central aperture defining wall 38 which defines a stud 26 receiving space 40 for centering and securing the insert 32 in its position.

The insert device 32 is situated to efficiently and smoothly turn an intake air stream 50 which is arriving through an intake air passageway 52, defined between lower surface of lid 36 and upper surface 54 of the air filter base 20. The passageway 52 directs air (reference arrows 50, 58) inwardly from the periphery 60 of air filter 10 towards the geometrical center line "C" of the filter 10, which center line "C" is here defined along the longitudinal axis occupied by stud 26. When the intake air 50, 58 reaches insert device 32, it is directed downwardly towards a fuel/air mixing chamber 61 in carburetor 12 having an annular downwardly flowing mixing passageway 62 with the same longitudinal axis "C" as the center of the intake air passageway 52 and the insert 32.

Figure 2:
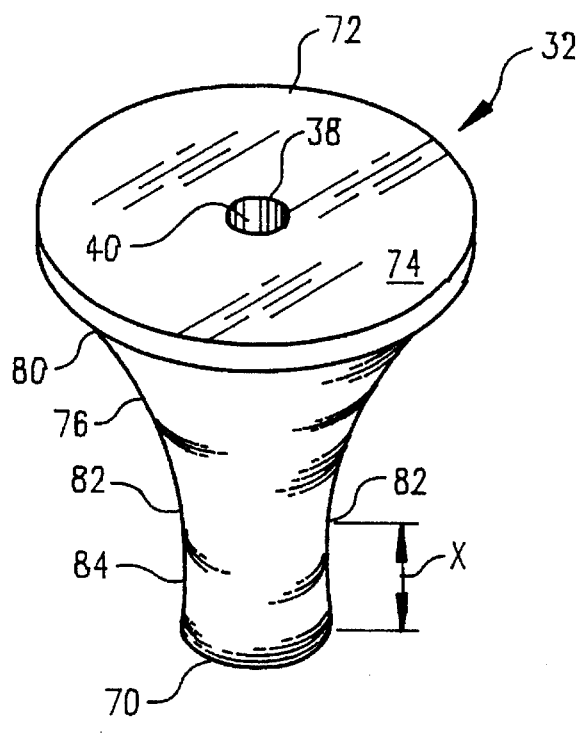
FIG. 2 is a perspective view of the insert device first shown above in FIG. 1.

The insert device 32 includes a first end 70 which is adapted to be operably located concentrically with the annular fuel/air mixing passageway 62. Insert 32 has a second end 72 opposite said first end 70. In operation, the first end 70 and second end 72 extend through the central axis "C". As seen in FIG. 2, at the second end 72, an upper wall 74 extends outwardly.

As evident from both FIGS. 1 and 2, a peripheral wall 76, the major portion of which is of diminishing outside diameter beginning circumferentially at a point 80 spaced outwardly from the center of insert 32 and at or near the upper wall 74 at the second end 72, and extending smoothly to a point of minimum diameter 82 and then connecting with a minor portion 84 which provides a smooth connection with the first end 70.

In operation, the intake air passageway 52 and the fuel/air mixing passageway 62 are arranged so as to provide an annular fuel/air passageway adjacent to the first end 70 of the insert 32, so that air 50 and 58 flows inward toward the peripheral wall 76 of insert 32 and then is turned in a smooth transition along the peripheral wall 76 to a downwardly direction adjacent the first end 70 of the insert 32, and thence inward toward said annular fuel/air mixing passageway 62 in carburetor 12. Although as illustrated the insert device 32 has an intake passageway 52 located along a first, substantially horizontal plane 88, and the longitudinal axis of the fuel/air mixing passageway 62 is located at an angle alpha ($\alpha$) of ninety degrees therefrom, other shapes may be utilized and still advantageously use an insert device according to the general teachings of the present invention.

Ideally, the peripheral wall 76 has a shape with a preselected curvature which is selected from any one of the following (a) a segment of a parabolic curve, (b) a segment of a hyperbolic curve, or (c) a roughly conical type surface, and in the latter instance, the insert takes on the general shape of a truncated inverted cone.

Figure 3:
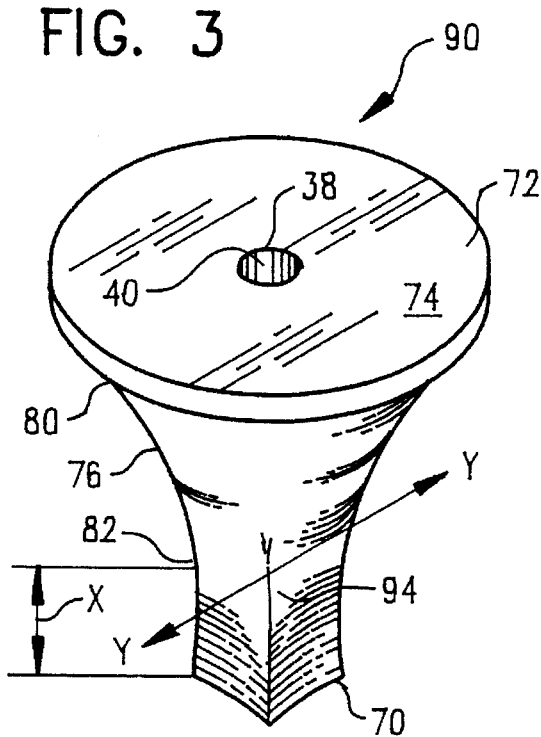
FIG. 3 is a perspective view of a second embodiment of the insert device, similar to that shown in FIG. 1 above.
Figure 4:
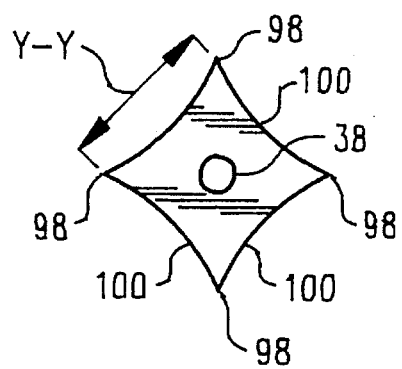
FIG. 4 is a reflected bottom view, take as if looking upward at the first end or bottom of the insert just set forth in FIG. 3.

In the embodiment illustrated in FIG. 2, the insert device 32 has a peripheral wall 76 of uniform radius at any single location along and from its longitudinal central axis C. However, in the embodiment shown in FIG. 3, the insert 90 is shown similar to the insert 32 illustrated above, but insert 90 assumes that the fuel/air mixing passageway 62 is divided into four subpassageways (not shown but well known in the art) as in a four barrel carburetor. In such design, from the point of minimum diameter 82, which occurs a distance X above the first end 70, four subwalls 94 are provided which direct the intake air stream 50 into the four subpassageways. These subwalls 94 are of smooth, concave shape, and the subwalls 94 enlarge outwardly (radially) from the central axis C along the longitudinal direction from the point of minimum diameter 82 to first end or bottom 70, and also enlarge from side to side in the lateral dimension (at ninety degrees to the longitudinal direction, shown here as the Y-Y direction). This combination of enlargement results in the formation of ridge lines 98 along four sides, in the case of this design for a four barrel carburetor. Thus, in this embodiment, the first end 70 is of a somewhat square shape having concave side portions 100 (representing the end of walls 94) as shown in FIG. 4.

By way of example, without the intent to limit the generality of the foregoing, an insert device 90 for a modified Holley 4150 and 4160 carburetor mentioned above has been designed. The insert device has a height along the longitudinal axis of 3.9 inches. It has a diameter at the first end of about 1.17 inches, a minimum diameter point 82 of about 0.98 inches, and a diameter at the second end 72 of 3.5 inches. A center bore 40 is of 0.25 inches diameter. The insert 90 has a generally square shaped lateral cross-section below the minimum diameter point 82, roughly including about 1 inch of height X from the first end 70, with Y-Y dimension of about 1.17 inches between ridge lines 98. As shown, about 0.10 inch adjacent the second end or top 72 is left in a generally cylindrical shape, before starting the inwardly decreasing peripheral wall 76.

It is to be appreciated that the novel air deflector insert provided by the present invention is a significant improvement in the state of the art of air intake devices for high performance engines. My novel insert is relatively simple, and it substantially improves the performance of vehicles which utilize the same.

It is thus clear from the heretofore provided description that my novel air deflector insert, as mounted and used in an air filter, is an appreciable improvement in the state of the art of air filter devices for internal combustion engines. It will be readily apparent to the reader that the my novel air deflector insert may be easily adapted to other embodiments incorporating the concepts taught herein. Thus, the invention may be embodied in other specific forms without departing from the spirit or essential characteristics thereof. Therefore, the embodiments presented herein are to be considered in all respects as illustrative and not restrictive, the scope of the invention being indicated by the appended claims rather than by the foregoing description, and all changes which come within the meaning and range of equivalences of the claims are therefore intended to be embraced therein.

I claim:

1. An insert device for placement between (i) a carburetor having an annular downwardly flowing mixing passageway with a longitudinal axis, and (ii) an air filter housing having a lid, said insert device adapted for turning an intake air stream from an air intake passageway, said passageway having a center with an air stream directed inwardly from a periphery towards the center, to said annular downwardly flowing mixing passageway, said insert device comprising:

(a) a first end, said first end adapted to be operably located concentrically with said annular downwardly flowing mixing passageway;
  (b) a second end opposite said first end, said first and second ends having a central axis extending therebetween, said second end having a center and an upper wall extending outwardly therefrom;
  (c) a peripheral wall of diminishing outside diameter beginning circumferentially at a point spaced outwardly from the center of said second end and adjacent to said upper wall, and extending smoothly to a point of minimum diameter towards the said first end;
  (d) wherein said air intake passageway and said annular downwardly flowing mixing passageway are arranged so that air flows inward toward said peripheral wall of said insert device and then is turned in a smooth transition along said peripheral wall to a downward direction adjacent said first end of said insert device, and thence inward toward said annular downwardly flowing mixing passageway.

2. The insert device of claim 1, wherein said peripheral wall has a shape with a preselected curvature, said peripheral wall shape curvature being selected from any one of the following:

(a) a segment of a parabolic curve;
  (b) a segment of a hyperbolic curve;
  (c) a conical surface.

3. The insert device of claim 1, wherein said peripheral wall shape is of uniform radius at any single location along said central axis.

4. The insert device of claim 1, further comprising a wall shape of gradually increasing diameter from said point of minimum diameter toward said first end.

5. The insert device of claim 1, wherein said annular downwardly flowing mixing passageway further comprises at least four subpassageways, and wherein said insert device further comprises at least four subwalls extending from the point of minimum diameter toward said first end, said subwalls of concave, gradually increasing lateral dimension from said point of minimum diameter toward said first end.

6. The insert device of claim 5, further comprising ridges between adjacent subwalls.

7. The insert device of claim 1, wherein the inward direction of said intake air passageway is located along a first plane, and the longitudinal axis of said annular downwardly flowing mixing passageway and said first plane have an angle alpha ($\alpha$) therebetween.

8. The insert device of claim 7, wherein said angle alpha is ninety degrees

9. The insert device of claim 1, wherein said device further comprises a solid, said solid having a center bore from said first end to said second end along said central axis.

10. The insert device of claim 1, wherein the inward direction of said intake air passageway is located along a first plane, and the longitudinal axis of said fuel/air mixing passageway and said first plane have an angle alpha ($\alpha$) therebetween.

11. The insert device of claim 10, wherein said angle alpha is ninety degrees.

12. The combination of an air filter, an air filter holder, and an insert device for turning an intake air stream from an air intake passageway, the passageway having a center with an air stream directed inwardly along a plane from a periphery adjacent said air filter towards the center, to a fuel/air mixing chamber having an annular downwardly flowing mixing passageway with a longitudinal axis, said combination comprising:

(a) an air filter housing, said air filter housing comprising
    (i) a base, said base adapted for being sealingly fitted to said annular downwardly flowing mixing passageway, and
    (ii) a lid;
  (b) an air filter, said air filter adapted to fit sealingly between said base and said lid of said air filter housing; and
  (c) said insert device comprising
    (i) a first end, said first end adapted to be operably located concentrically with said annular downwardly flowing mixing passageway;
    (ii) a second end opposite said first end, said first and second ends having a central axis extending therebetween, said second end having a center and an upper wall extending outwardly therefrom, so that said upper wall of said insert device fits against said lid of said air filter housing;
    (iii) a peripheral wall of diminishing outside diameter beginning circumferentially at a point spaced outwardly from the center of said second end and adjacent to said upper wall, and extending smoothly to a point of minimum diameter towards the said first end;
  (d) wherein said air intake passageway and said annular downwardly flowing mixing passageway are arranged so that air flows through said air filter, thence inward toward said peripheral wall of said insert device, and then is turned in a smooth transition along said peripheral wall to a generally downward direction adjacent said first end of said insert device, and thence outward toward said annular downwardly flowing mixing passageway.

13. The insert device of claim 12, wherein said insert device further comprises a solid, said solid having a center bore from said first end to said second end along said central axis.

14. The insert device device of claim 12, wherein said peripheral wall has a shape with a preselected curvature, said peripheral wall shape curvature being selected from any one of the following:

(a) a segment of a parabolic curve;

(b) a segment of a hyperbolic curve;

(c) a conical surface.

15. The insert device of claim 12, wherein said peripheral wall shape is of uniform radius at any single location along said central axis.

16. The insert device of claim 12, further including a wall shape, beginning at said point of minimum diameter, of increasing diameter toward said first end.

17. The insert device of claim 12, wherein said annular downwardly flowing mixing passageway further comprises at least two subpassageways, and wherein said insert device comprises two or more subwalls beginning at said point of minimum diameter and extending toward said first end, said two or more subwalls each of concave, gradually increasing lateral dimension.

18. The insert device of claim 17, wherein at least four subwalls are provided.

19. The insert device of claim 17, further comprising ridges between adjacent subwalls.

20. The insert device of claim 12, wherein said insert device has a height along said central axis of about 3.9 inches.

21. The insert device of claim 12, wherein said first end of said insert device has a diameter of about 3.5 inches.

* * * * *